(12) United States Patent
Hart et al.

(10) Patent No.: US 9,807,813 B2
(45) Date of Patent: Oct. 31, 2017

(54) PROBE RESPONSE SUPPRESSION

(71) Applicant: Cisco Technology, Inc., San Jose, CA (US)

(72) Inventors: Brian D. Hart, Sunnyvale, CA (US); John Matthew Swartz, Lithia, FL (US); Joshua Suhr, Lenexa, KS (US); Matthew A. Silverman, Shaker Heights, OH (US); Tak Ming Pang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 14/687,241

(22) Filed: Apr. 15, 2015

(65) Prior Publication Data
US 2016/0309537 A1 Oct. 20, 2016

(51) Int. Cl.
*H04W 76/02* (2009.01)
*H04B 17/318* (2015.01)
*H04W 24/08* (2009.01)

(52) U.S. Cl.
CPC ........ *H04W 76/027* (2013.01); *H04B 17/318* (2015.01)

(58) Field of Classification Search
None
See application file for complete search history.

(56) References Cited

U.S. PATENT DOCUMENTS

| 7,480,485 | B1 | 1/2009 | Oh et al. |
| 2003/0171116 | A1 | 9/2003 | Soomro |
| 2005/0003865 | A1 | 1/2005 | Lastinger et al. |
| 2005/0245237 | A1 | 11/2005 | Adachi et al. |
| 2006/0146747 | A1 | 7/2006 | Shpak |
| 2006/0198348 | A1 | 9/2006 | Lin et al. |
| 2007/0296998 | A1 | 12/2007 | Iwamoto et al. |
| 2008/0004076 | A1 | 1/2008 | Adachi et al. |
| 2008/0080388 | A1 | 4/2008 | Dean et al. |
| 2008/0126668 | A1 | 5/2008 | Okuno et al. |
| 2009/0077233 | A1 | 3/2009 | Kurebayashi et al. |
| 2010/0001523 | A1 | 1/2010 | Sato et al. |
| 2011/0307609 | A1* | 12/2011 | Rangarajan ....... H04W 72/1252 709/225 |

(Continued)

OTHER PUBLICATIONS

"Access Point Selection Strategy in IEEE802.11e WLAN Networks" Takeuchi et al., pp. 914-919, Sep. 18, 2006.

(Continued)

*Primary Examiner* — Huy D Vu
*Assistant Examiner* — Hong Shao
(74) *Attorney, Agent, or Firm* — Edell, Shapiro & Finnan, LLC

(57) ABSTRACT

In response to receiving a probe request from a mobile client, an access point determines whether it should suppress a probe response. The access point receives a probe request from a wireless client device, and prepares a probe response to respond to the probe request. The access point determines whether the wireless client device is likely to associate with the wireless access point. Responsive to a determination that the wireless client device is unlikely to associate with the wireless access point, the access point suppresses the transmission of the probe response.

27 Claims, 5 Drawing Sheets

(56) References Cited

U.S. PATENT DOCUMENTS

| | | | |
|---|---|---|---|
| 2013/0188628 A1* | 7/2013 | Lee | H04W 48/14 370/338 |
| 2013/0294270 A1* | 11/2013 | Yang | H04W 48/16 370/252 |
| 2014/0357292 A1* | 12/2014 | Walma | H04W 64/00 455/456.1 |

OTHER PUBLICATIONS

Casey, "Base Station Controlled Load Balancing with Handovers in Mobile WiMAX," Master's Thesis, Helsinki University of Technology, Jan. 10, 2008, 109 pages.

\* cited by examiner

PROBE RESPONSE SUPPRESSION

TECHNICAL FIELD

The present disclosure relates to wireless systems.

BACKGROUND

In wireless network systems, a wireless client device can detect nearby access points by broadcasting a probe request, and listening for probe responses from any access points that hear the probe request. The probe responses will typically include information about the responding access point and the wireless network to which the access point provides service. The probe response may include information such as a transmitter address of the access point, a destination address of the client device that sent the probe request, a retry flag, the Service Set Identifier (SSID) of the wireless network, supported data rates, as well as other information about the access point.

DESCRIPTION OF EXAMPLE EMBODIMENTS

Overview

In accordance with an example embodiment, a method is provided for determining whether an access point's radio should suppress a probe response. The access point's radio receives a probe request from a wireless client device, and prepares a probe response to respond to the probe request for each Basic Service Set Identifier (BSSID) enabled on that access point's radio. The access point determines whether the wireless client device is likely to associate with a BSSID enabled on the wireless access point's radio, for example, the client device is still co-channel with the AP's radio. Responsive to a determination that the wireless client device is unlikely to associate with a BSSID enabled on the wireless access point (e.g., the wireless client device is no longer monitoring the same channel as the AP's radio), the access point's radio suppresses the transmission of the probe response for one or more BSSIDs.

Example Embodiments

In a dense wireless environment, i.e., with multiple access points and clients overlapping, probe responses may become a growing source of wireless "noise pollution." With an increasing number of co-channel access points trying to respond to an increasing number of client devices, collisions may cause probe responses to be delayed, and the client devices may give up on listening for a probe response and move on to a new channel. Additionally, if the client device does not acknowledge a probe response for which it sent a probe request, then each access point's radio may try to resend the probe response multiple times, adding to the wireless congestion.

Figure 1:
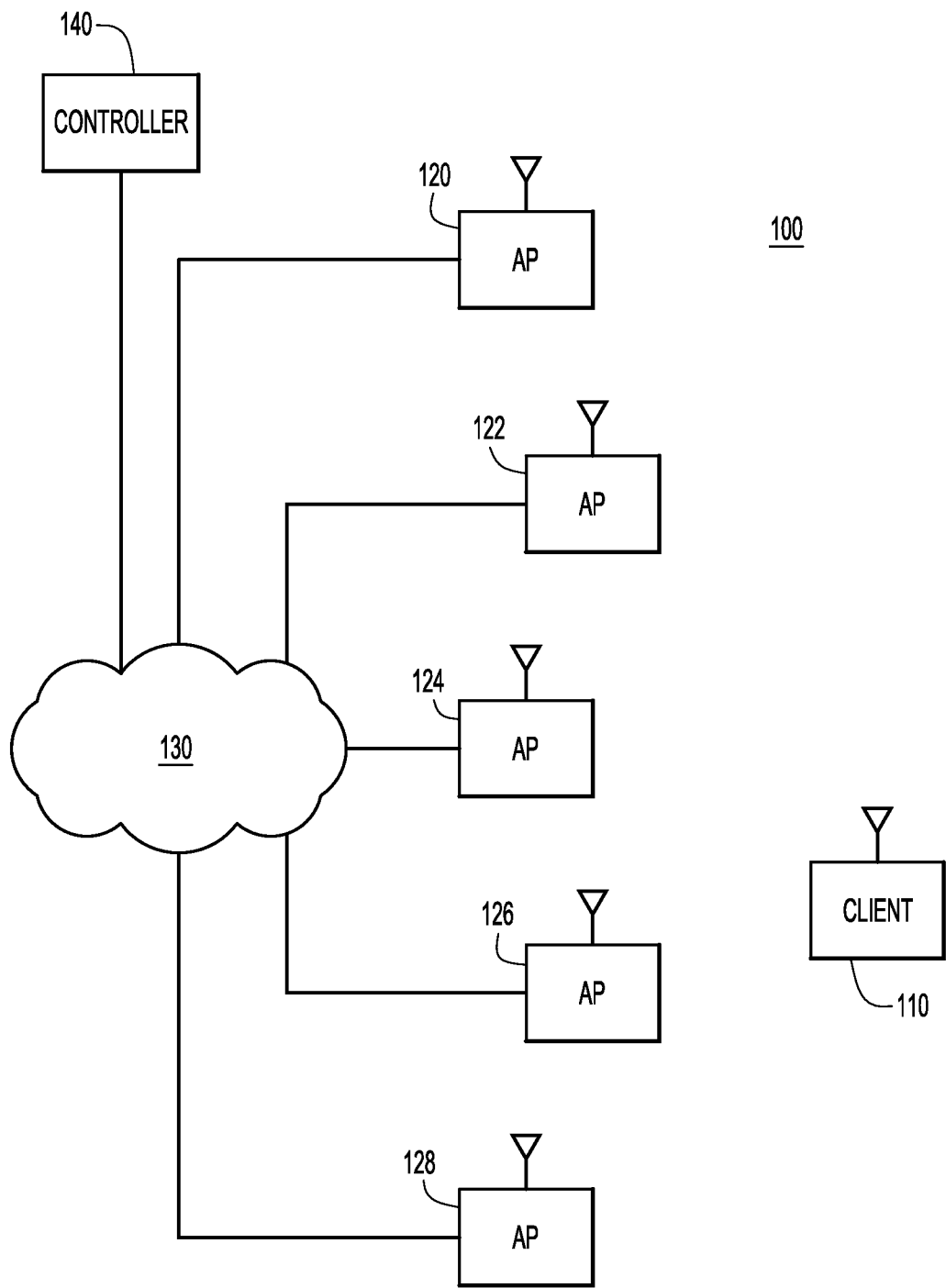
FIG. 1 is a system diagram of a plurality of access points and a plurality of wireless beacon devices that suppress unnecessary probe responses, according to an example embodiment.

Referring first to FIG. 1, a system 100 is shown that includes a wireless mobile client device 110, and a plurality of access points 120, 122, 124, 126, and 128 that are configured to provide access to wireless network services. The access points 120, 122, 124, 126, and 128 are coupled through a computer network 130, which may include one or more wired or wireless networks. A controller 140 may be used to coordinate the operations of access points 120, 122, 124, 126, and/or 128. While only five access points and one wireless mobile device is shown, any number of access points and/or mobile devices may be used in system 100. Hereinafter, the wireless mobile client device 110 may be referred to interchangeably as the mobile device, the client, the client device, or the mobile client device.

In one example, the access points 120, 122, 124, 126, and 128 are wireless local area network (WLAN) access point (AP) radios configured to operate in accordance with the IEEE 802.11 standard, as used in Wi-Fi™ products. A mobile client 110 may broadcast a probe request frame to determine the capabilities of nearby APs. A probe request frame may include the Service Set Identifier (SSID) of a specific network, a general broadcast SSID, and the data rates supported by the mobile client. The physical AP may include multiple radios, for example, one radio for 2.4 GHz and one radio for 5 GHz, where a radio may include MIMO antennas, transceivers, baseband processing and medium access control.

In response to receiving a probe request on the same channel as one of its radios, an AP will typically transmit a probe response frame that includes information about the wireless network provided by the AP. This information may comprise a Basic Service Set Identifier (BSSID), supported data rates, and security requirements for the wireless network. Some WLAN APs, for each of their radios, may provide wireless network access to a plurality of networks (e.g., a public network and a private network) and an AP radio may transmit a probe response for each network that the AP services.

Figure 2:
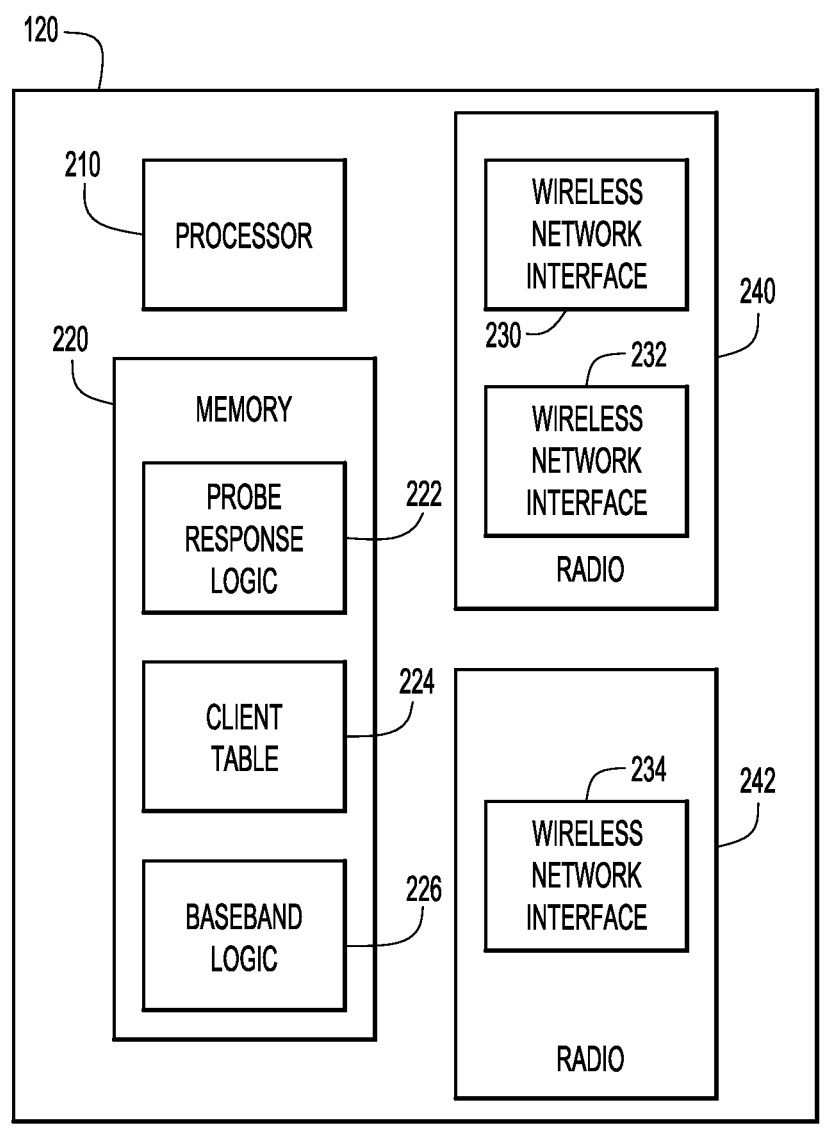
FIG. 2 is a block diagram of an access point that is configured to suppress probe responses, according to an example embodiment.

Referring now to FIG. 2, an example block diagram of access point 120 is shown. The AP 120 includes, among other possible components, a processor 210 to process instructions relevant to providing access to wireless network (e.g., generating probe responses), and a memory 220 to store a variety of data and software instructions (e.g., probe response logic 222, client table 224, and baseband logic 226). The AP 120 also includes wireless network interfaces 230, 232, and 234 to transmit and receive wireless signals in support of different bands and/or channels in wireless computer networks. The AP 120 also includes two radios 240 and 242 that process the radio frequency signals for the wireless network interfaces 230, 232, and 234. For example, the radios 240 and 242 may be chipsets that transmit and receive signals compliant with the IEEE 802.11 standard, where each radio may have one or more BSSIDs enabled through the wireless network interfaces 230, 232, and 234.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

In one example, each radio 240 and 242 operates to provide access to a separate band (e.g. 2.4 GHz or 5 GHz) and each wireless network interface 230, 232, 234 provides (virtualized) access to one or more networks, i.e., SSIDs. For each SSID advertised by a wireless network interface, a separate BSSID is assigned to identify any probe responses that the access point transmits through each respective wireless network interface 230, 232, or 234.

In another example, radio 240 may provide access to the 2.4 GHz band, with wireless network interface 230 using a first BSSID to provide access to a first wireless network/SSID (e.g., a public wireless network). Wireless network interface 232 may use the same radio 240 with a second BSSID to provide access on the 2.4 GHz band to a second wireless network/SSID (e.g., a private corporate network). The radio 242 may provide access to the 5 GHz band, with wireless network interface 234 using a third BSSID to provide access to the second wireless network/SSID. Generally, for each combination of frequency band and wireless network, i.e., radio and SSID, a separate wireless network interface may use a different BSSID to communicate with wireless clients.

Alternatively, each wireless network interface 230, 232, and 234 may function as a radio head that converts radio frequency signals into a baseband signal IQ comprising an in-phase signal I and a quadrature signal Q and vice versa. The radio heads may pass baseband signals to a centralized processor "141" within 140 or "142" alongside 140, which uses baseband logic (in 141 or 142) to process the signals as wireless network signals such as probe requests.

Figure 3:
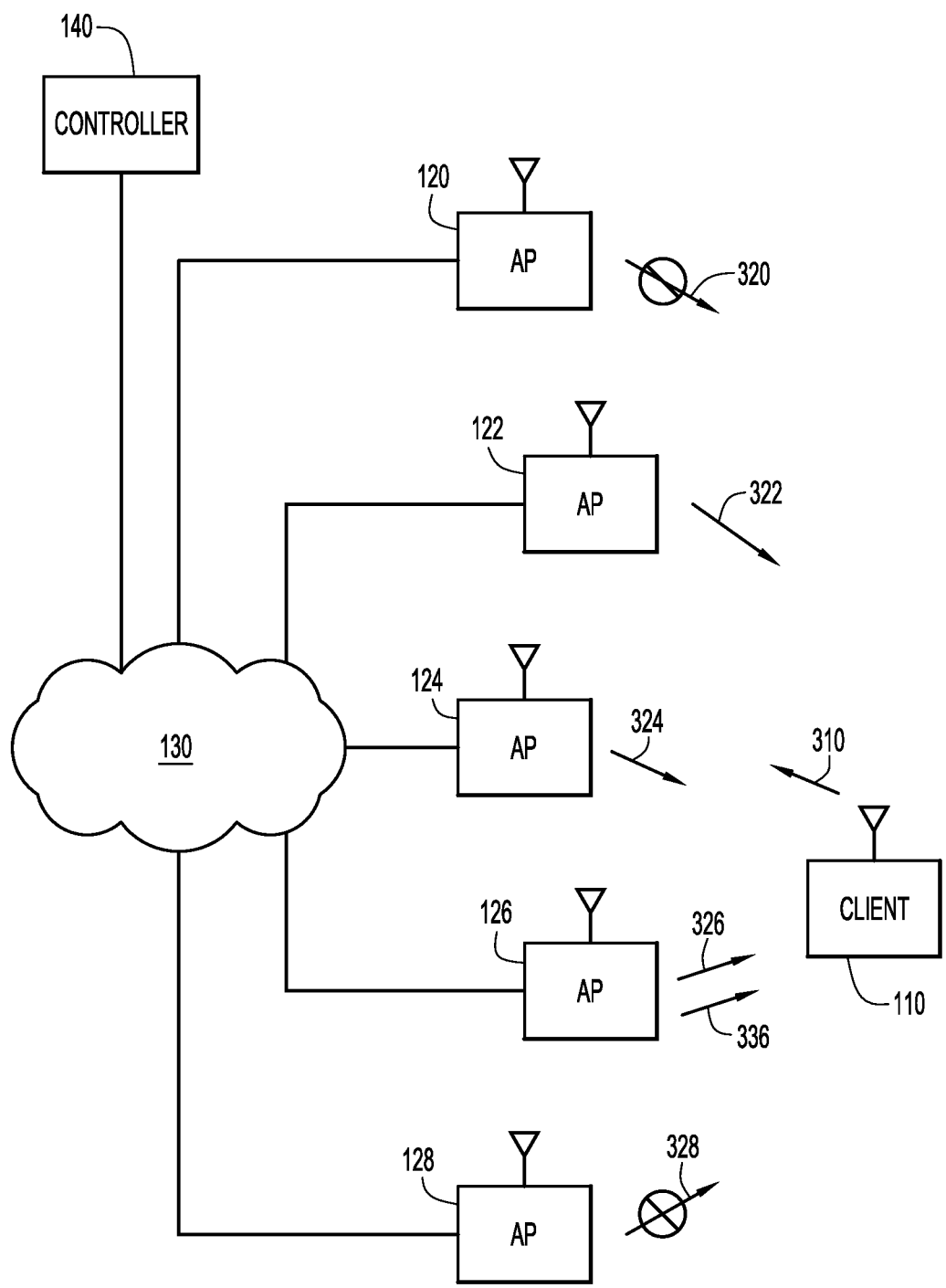
FIG. 3 is a block diagram of a wireless network in which an access point's radio suppresses probe responses, according to an example embodiment.

In another example, the client table 224 comprises a list of client devices that have been detected recently (e.g., within a predetermined amount of time) at nearby access points 122, 124, 126, 128. The client table 224 may also comprise the identity and location information of the nearby access point with which each client device has associated. The client table 224 may be used by the access point 120 to suppress the transmission of a probe response, e.g., if one of the detected nearby access points has associated with the client device recently. The access point 120 may suppress the probe response if the client table 224 indicates that several access points are located closer to an estimated position of the mobile client, i.e., the position of the access point with which the mobile client has last associated. In another example, the client table 224 may be used by the access point 120 to delay transmission of a probe response, giving time for other access points, which may be more suitable to provide service to the mobile client, to transmit their own probe responses and associate with the mobile client. Referring to FIG. 3, a diagram is shown of an example of access points receiving a probe request and coordinating the probe responses according to an example embodiment. Mobile client 110 transmits a probe request frame 310 such that each of the APs 120, 122, 124, 126, and 128 receive the probe request 310. The APs 120, 122, 124, 126, and 128 prepare probe response frames 320, 322, 324, 326, and 328, respectively. However, the AP 120 and the AP 128 have suppressed or delayed transmission of the probe responses, since each has determined that other APs, such as APs 122, 124, and 126, are more likely to provide wireless network service that the mobile client 110 requests.

The probe responses 320 and 328 may be delayed based on a detected Received Signal Strength Indication (RSSI), to allow time for probe response 322, 324, and/or 326 to be received and acknowledged by the client 110. Additionally, probe responses 320 and/or 328 may be delayed based on a loading factor of the respective AP, such that a higher-loaded AP may delay transmitting a probe response. The determination that other APs are more likely to provide wireless network service may be based on the client table 224 or hearing probe responses 322, 324, and/or 324 already transmitted by the other APs that respond sooner.

Additionally, the AP 126 transmits a retry probe response 336 if mobile client 110 does not acknowledge the first probe response 326. Depending on the setting of each AP, multiple additional retry probe responses may be transmitted before the AP gives up on responding to the probe request 310. The number of additional retry attempts may vary between APs, for example, APs 126 may retry four times, while APs 122 and 124 may only attempt one retry probe response. In one example, the number of retry attempts may be based on information in the client table 224.

In one example, the AP 128 may detect that other APs are sending probe responses 322, 324, 326, and 336, which have not been acknowledged by the mobile client 110. The AP 128 may monitor for an acknowledgement within the Short Interframe Space (SIFS) plus a short interval (e.g., a fraction of a slot) of the probe responses. Additionally, the AP 128 may detect multiple retry probe responses (e.g., with the same Transmitter Address (TA), Receiver Address (RA), sequence number, and with the Retry bit set) from one AP or multiple retried probe responses (e.g., with the same Receiver Address (RA) and with the Retry bit set) from two or more APs, and infer that the client device 110 is not likely to respond to its probe response 328.

Upon determining that the mobile client 110 is not likely to respond to its probe response 328, e.g., because the mobile client is no longer tuned to and receiving signals on that channel, the AP 128 suppresses the transmission of probe response 328. Alternatively, the AP 128 may transmit the probe response 328, but reduce the number of retry attempts before giving up on the mobile client 110. By wirelessly sniffing the probe responses of other APs, the AP 128 may reduce its contribution to the wireless congestion by eliminating or reducing probe responses that are not likely to be useful to the mobile client 110 in finding a wireless network service.

In another example, an AP may include multiple BSSIDs/wireless network interfaces co-located in a single hardware device, as shown in FIG. 2, and the AP may monitor the success of probe responses sent by all of the wireless network interfaces in the AP. The AP may suppress the probe response from one BSSID/wireless network interface based on the failure of one or more other BSSIDs/wireless network interfaces to successfully transmit a probe response. By monitoring the probe responses from BSSIDs/wireless network interfaces within the same hardware AP, there is no need to wirelessly sniff probe responses and acknowledgements to determine if each probe response has succeeded or failed.

Figure 4:
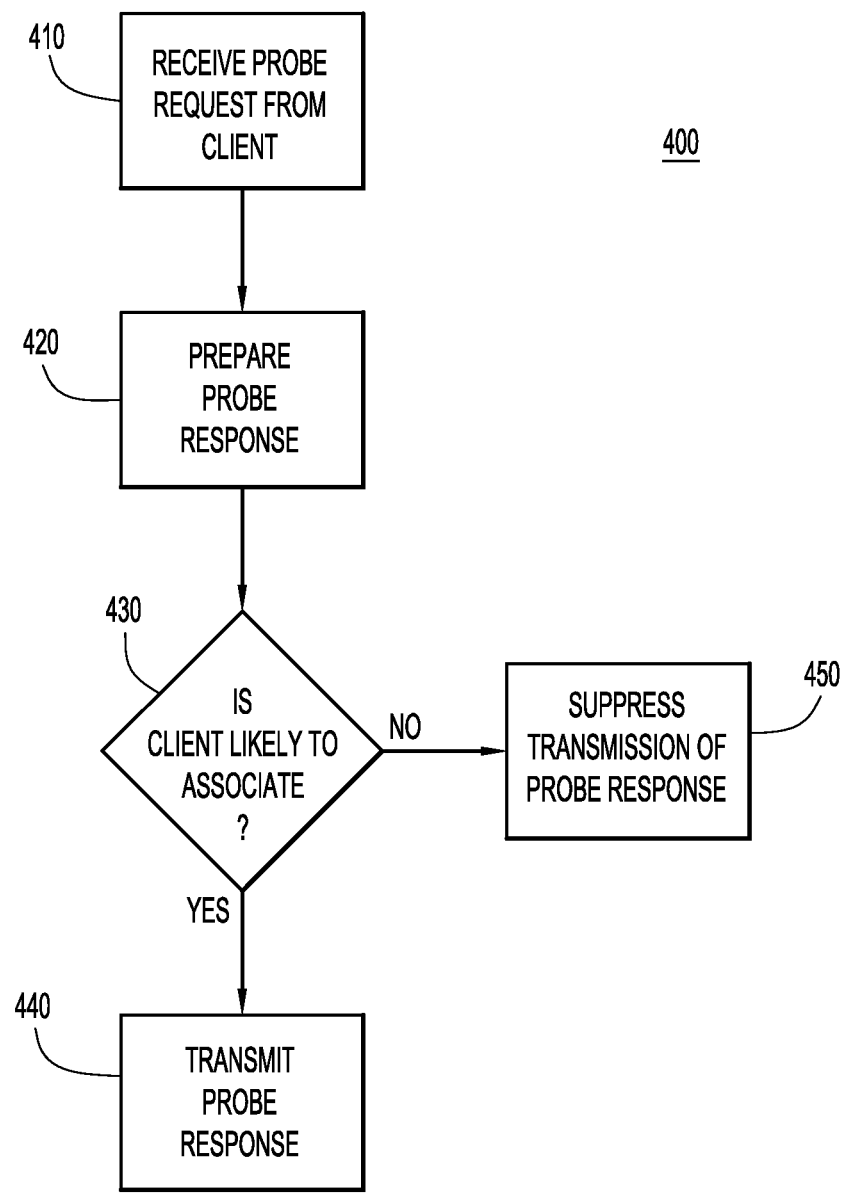
FIG. 4 is a flow chart illustrating operations of a method to suppress unnecessary probe responses from an access point's radio, according to an example embodiment.

Referring now to FIG. 4, an example process 400 is described of the operations of a method performed by an AP in response receiving to a probe request. In step 410, the AP receives a probe request from a client device. For each BSSID enabled on the AP, the AP prepares a probe response, at step 420, which will answer the probe request with the capabilities of the BSSID within the AP. Before transmitting the probe response, in step 430, the AP determines if the client device that sent the probe request is likely to associate with the AP, for example, the client device is likely to be monitoring the same channel and available to receive and acknowledge the probe response. If the client device is likely to receive and acknowledge the probe response and/or to associate with the AP's BSSID, then the AP transmits the probe response for that BSSID at step 440. If the client device is not likely to associate with the AP for that BSSID (e.g., the client is not longer monitoring the same channel as the BSSID), then the AP suppresses the transmission for that BSSID at step 450, and does not respond to the probe request.

In one example, the AP may determine that the client device is likely to associate with the AP by listening for probe responses from other APs and listening for acknowledgements from the client device. If the AP detects multiple probe responses from other APs, and does not detect an acknowledgement from the client device, then the AP may determine that the client device is no longer monitoring the wireless channel that the probe request was sent on. Since the client device is no longer monitoring the channel, it is unlikely to associate with the AP on that channel, and any probe response transmitted on that channel would create wireless congestion and contribute to the noise floor of all wireless transmissions.

In another example, the AP may determine that the client is unlikely to associate with the AP by listening for multiple probe response retry attempts. If the AP detects that other APs have retried multiple times to send a probe response, then the AP may determine that the client device is no longer monitoring the channel.

Due to the inherently uncertainty of the medium for wireless transmissions, a single AP may be able to receive the probe request from the client device, but the client device may not receive the probe response or any retry attempts from that single AP. To prevent an AP from suppressing its probe response transmission erroneously based on the failed probe responses from a single other AP, each AP may require that it detect failed probe responses from multiple different other APs before suppressing its probe response transmission.

In one example, an AP may delay the transmission of the probe response, for example, in accordance with the RSSI of the received probe request. APs that hear the probe request at a higher RSSI may schedule their probe responses earlier. This delay allows APs that may be better suited to provide service to the mobile client to transmit their probe responses before APs that may be capable of providing the service at a lower signal level. In another example, an AP that hears a probe request but no acknowledgements, or retried probe responses, has a much higher confidence that the client is indeed not available to receive any packet (e.g., it is no longer co-channel)

Figure 5:
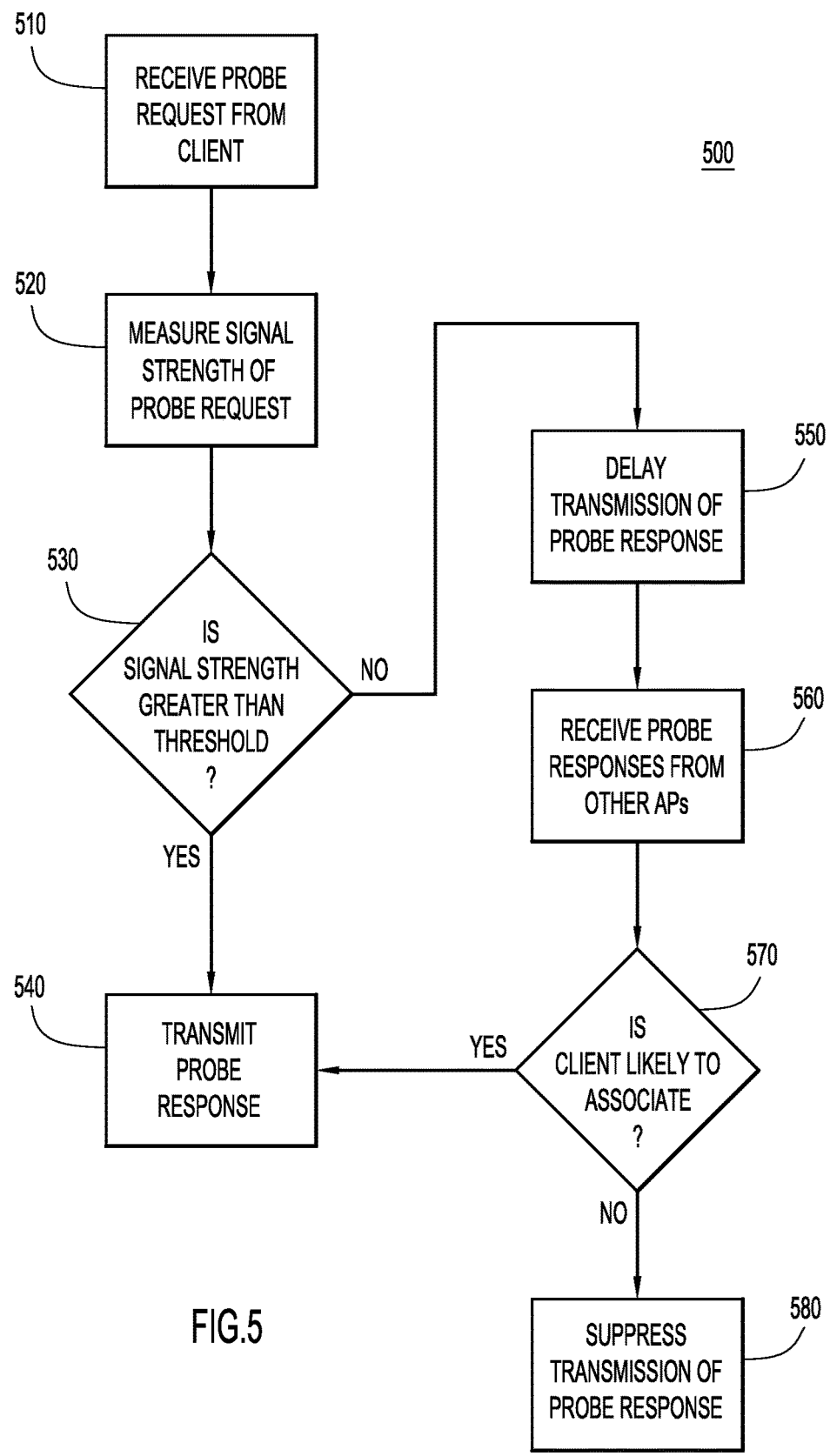
FIG. 5 is a flow chart illustrating operations of a method to determine how much to delay a probe response based on the signal strength of the probe request, according to an example embodiment.

Referring now to FIG. 5, an example process 500 is described of the operations that an AP performs in delaying the transmission of a probe response based on the received signal strength of the probe request. The AP receives a probe request from a mobile client at step 510, and measures the signal strength of the probe request at step 520. The signal strength may be measured as a Received Signal Strength Indication (RSSI) measurement of the probe request. If the signal strength is greater than a predetermined threshold, as determined in step 530, then the AP transmits the probe response, as scheduled, at step 540.

If the signal strength is below the predetermined threshold, as determined in step 530, then the AP delays the transmission of the probe response at step 550. During the delay, the AP listens for probe responses from other APs at step 560. With the information provided by the probe responses and any detected acknowledgements, the AP determines if the mobile client is likely to associate with the AP in step 570. If the mobile client is likely to associate with the AP (e.g., it has not detected many failed probe responses from other APs), then the AP transmits the probe response at step 540. If the mobile client is not likely to associate with the AP (e.g., it has detected multiple failed probe response from multiple other APs), then the AP suppresses the transmission of its probe response at step 580.

In one example, the amount of time that the AP delays the transmission of the probe response is related to a measure of the distance from the mobile client to the access point, such as the measured signal strength of the probe request. The delay may be directly proportional to the amount that the signal strength is below a threshold, such that for every 1 decibel (dB) below the threshold the delay increases by 0.1 milliseconds (ms). Alternatively, the delay may be separated into bands, such that probe requests with signal strength within 10 dB of the threshold are responded to with a probe response delayed by 1 ms, probe requests received with a signal strength between 10 dB and 20 dB below the threshold are responded to with a probe response that is delayed by 2 ms, and probe requests with a signal strength more than 20 dB below the threshold are responded to with a probe response that is delayed by 3 ms. Additionally, probe requests that are measured with a signal strength below a second threshold may be completely ignored, and have any probe response suppressed. Further, a small amount of random delay may be added to the delay of the probe response.

In another example, the controller of the APs in a neighborhood may compute a list of neighboring APs for each AP. From this list, the Media Access Control (MAC) address, primary channel, and signal strength threshold of mobile clients currently associated with an AP may be propagated to the neighboring APs. The same mobile client may have different signal strength threshold sent to different neighbor APs based on the proximity of these APs to the associated AP. Each AP may use this threshold to filter out probe requests below the threshold or filter out probe requests from mobile clients that are known to be associated with a neighboring AP.

Each AP may have a database of clients that are associated with neighboring APs. Any probe request from a client that is not in the database is considered to be from an unassociated client. The signal strength threshold and delay may be different for client devices that are associated, i.e., listed in the database, and client devices that are un-associated, i.e., not listed in the database. An associated client may have a higher threshold and a higher delay to defer the occurrence of an AP from sending a probe response to a client that is already being serviced by another AP until the new AP is clearly able to provide better service.

Additionally, the direction and rate of change of signal strength measurements from probe requests may affect the threshold and/or delay applied to probe responses. Storing a history of probe requests from each client and their measured signal strengths enables the controller to predict the direction that the mobile client is moving, and adjust the threshold and delay values of neighboring APs accordingly.

Further, a record of the primary channel used by each client may be used to determine if a probe response can be delayed for a longer period of time. Since client devices typically do not change to another channel quickly, APs with the same primary channel may increase the delay in transmitting a probe response.

In yet another example, the controller of a neighborhood of APs may store the time and channel of the last heard packet from each un-associated client in a database. This database may be used to calculate the typical scanning interval for each client and identify the channel order that each client uses. From the information in this database, the controller may adjust the delay and threshold parameters for each AP in the neighborhood to ensure that the most appropriate AP responds on the most appropriate channel at the most appropriate time for each un-associated client.

In another example, a centralized controller may process baseband signals that are passed from "dumb" access points, or radio heads (also referred to herein as radio transceivers). The radio heads convert radio frequency signals to baseband signals and pass the baseband signals along to the centralized controller without any processing. This allows the baseband signals to reach the controller more quickly than a case in which each of the access points processes the baseband signals to determine the type and meaning of the signal (e.g., that the signal is a probe request on a specific wireless channel).

By centralizing the processing of the baseband signals, the controller can detect a probe request from a wireless client and direct the appropriate radio head to respond with a probe response on the appropriate channel. The radio heads may be located at different physical locations. By tracking any probe requests sent by a wireless client, the controller can track the location of the wireless client, as well as the scanning interval and channel list order that each wireless client uses.

The controller may additionally predict where the wireless client will be at a future time based on the location of the radio heads that detected the probe requests, and may be able to direct the closest radio head to the predicted location to transmit the probe response. The controller may also predict whether the wireless client will be listening to a specific channel based on the scanning interval, which may inform the decision on whether the wireless client is likely to associate with a particular radio head/access point. Using the channel order detected from the received probe requests, the controller may also predict which channel the wireless client will be monitoring for a probe response at any time in the future. Combining all of these predictions, the controller may ensure that the probe response is transmitted from the closest radio head at a channel that the wireless client device is most likely to be monitoring at any particular time.

In summary, the techniques presented herein enable each AP in a dense wireless environment to detect when the transmission of a probe response is unlikely to be successful or useful to a client devices probe request, and to suppress the transmission when so detected. The AP may also delay the transmission of a probe response to allow time to gather information from other APs' probe responses, and use that information to enable a better determination of the likelihood of success for its own probe response. In this way, an AP can detect when the transmission of probe responses is unlikely to be successful, and "swallow" them when so detected. This can significantly reduce "junk" probe responses and congestion in dense environments.

In one form, a method is provided for determining whether an access point should suppress a probe response. The access point receives a probe request from a wireless client device, and prepares a probe response to respond to the probe request. The access point determines whether the wireless client device is likely to associate with the wireless access point. Responsive to a determination that the wireless client device is unlikely to associate with the wireless access point, the access point suppresses the transmission of the probe response.

In another form, an apparatus is provided comprising a wireless network interface, and a processor coupled to the network interface unit. The processor receives via the wireless network interface, a probe request from a wireless client device. In response to receiving the probe request, the processor prepares a probe response. The processor determines whether the wireless client device is likely to access a wireless network through the apparatus. Responsive to a determination that the wireless client device is unlikely to access the wireless network through the apparatus, the processor suppresses transmission of the probe response.

In yet another form, a system is provided comprising a plurality wireless access points to provide access to one or more wireless networks. A first wireless access point, among the plurality of wireless access points, receives a probe request from a wireless client device and prepares a probe response. The first wireless access point determines whether the wireless client device is likely to access the one or more wireless networks through the first wireless access point. Responsive to a determination that the wireless client device is unlikely to access the one or more wireless networks through the first wireless access point, the first wireless access point suppresses transmission of the probe response.

In still another form, a method is provided for controlling a plurality of radio heads from a central controller. The central controller receives a probe request forwarded from at least one of the plurality of radio heads (radio transceivers) as a first baseband signal received from a wireless client device. The controller prepares a probe response to respond to the probe request, and determines a particular radio transceiver that is likely to associate with the wireless client device. The controller provides the probe response to the particular radio transceiver as a second baseband signal.

The above description is intended by way of example only. Various modifications and structural changes may be made therein without departing from the scope of the concepts described herein and within the scope and range of equivalents of the claims.

What is claimed is:

1. A method comprising:
   receiving a probe request at a wireless access point from a wireless client device;
   preparing a probe response to respond to the probe request;
   determining whether the wireless client device is likely to associate with the wireless access point; and
   responsive to a determination that the wireless client device is unlikely to associate with the wireless access point, delaying transmission of the probe response by a predetermined amount of time if a signal strength of the probe request is lower than a first threshold, wherein the predetermined amount of time increases as a difference between the signal strength of the probe request and the first threshold increases.

2. The method of claim 1, further comprising measuring the signal strength of the probe request.

3. The method of claim 2, further comprising suppressing transmission of the probe response if the signal strength of the probe request is lower than a second threshold.

4. The method of claim 2, further comprising suppressing transmission of the probe response if at least one other wireless access point is located closer to an estimated position of the wireless client device than the wireless access point.

5. The method of claim 1, further comprising:
monitoring for probe responses from a plurality of other wireless access points; and
suppressing transmission of the probe response after detecting a plurality of unacknowledged probe responses or a plurality of retried probe responses from the plurality of other wireless access points.

6. The method of claim 1, wherein the delaying transmission of the probe response by the predetermined amount of time is based on a loading factor of the wireless access point.

7. The method of claim 5, wherein the monitoring for probe responses from a plurality of other wireless access points is performed during the predetermined amount of time.

8. The method of claim 5, wherein at least one of the plurality of other wireless access points is co-located with the wireless access point.

9. An apparatus comprising:
a wireless network interface unit to provide access to a wireless network for a wireless client device;
a processor coupled to the wireless network interface unit, wherein the processor is configured to:
receive via the wireless network interface, a probe request from the wireless client device;
prepare a probe response to respond to the probe request;
determine whether the wireless client device is likely to access the wireless network through the apparatus; and
responsive to a determination that the wireless client device is unlikely to access the wireless network through the apparatus, delay transmission of the probe response by a predetermined amount of time if a signal strength of the probe request is lower than a first threshold, wherein the predetermined amount of time increases as a difference between the signal strength of the probe request and the first threshold increases.

10. The apparatus of claim 9, wherein the processor is configured to measure the signal strength of the probe request.

11. The apparatus of claim 10, wherein the processor is further configured to suppress transmission of the probe response if the signal strength of the probe request is lower than a second threshold.

12. The apparatus of claim 10, wherein the processor is further configured to suppress transmission of the probe response if at least one other wireless access point is located closer to an estimated position of the wireless client device than the apparatus.

13. The apparatus of claim 9, wherein the processor is configured to:
monitor for probe responses from a plurality of other wireless access points; and
suppress transmission of the probe response after detecting a plurality of unacknowledged probe responses or a plurality of retried probe responses from the plurality of other wireless access points.

14. The apparatus of claim 9, wherein the processor is configured to delay transmission of the probe response by the predetermined amount of time based on a loading factor.

15. The apparatus of claim 13, wherein the processor is configured to monitor for probe responses from a plurality of other wireless access points during the predetermined amount of time.

16. The apparatus of claim 13, wherein at least one of the plurality of other wireless access points is co-located with the apparatus.

17. A system comprising:
a plurality of wireless access points to provide access to one or more wireless networks;
a first wireless access point among the plurality of wireless access points to:
receive a probe request from a wireless client device;
prepare a probe response to respond to the probe request;
determine whether the wireless client device is likely to access the one or more wireless networks through the first wireless access point; and
responsive to a determination that the wireless client device is unlikely to access the one or more wireless networks through the first wireless access point, delay transmission of the probe response by a predetermined amount of time if a signal strength of the probe request is lower than a first threshold, wherein the predetermined amount of time increases as a difference between the signal strength of the probe request and the first threshold increases.

18. The system of claim 17, wherein the first wireless access point is configured to measure the signal strength of the probe request.

19. The system of claim 18, wherein the first wireless access point is further configured to suppress transmission of the probe response if the signal strength of the probe request is lower than a second threshold.

20. The system of claim 18, wherein the first wireless access point is further configured to suppress transmission of the probe response if at least one other wireless access point among the plurality of wireless access points is located closer to an estimated position of the wireless client device than the first wireless access point.

21. The system of claim 17, wherein the first wireless access point is further configured to:
monitor for other probe responses from other wireless access points among the plurality of wireless access points; and
suppress transmission of the probe response after detecting a plurality of unacknowledged probe responses or a plurality of retried probe responses from other wireless access points among the plurality of wireless access points.

22. The system of claim 17, wherein the first wireless access point is configured to delay transmission of the probe response by the predetermined amount of time based on a loading factor of the first wireless access point.

23. The system of claim 21, wherein the first wireless access point is configured to monitor for probe responses from other wireless access points among the plurality of wireless access points during the predetermined amount of time.

24. The system of claim 21, wherein at least one of the other wireless access points is co-located with the first wireless access point.

25. A method comprising:
receiving a probe request at a central controller in communication with a plurality of radio transceivers, the probe request being forwarded from at least one of the plurality of radio transceivers as a first baseband signal received from a wireless client device;

preparing a probe response to respond to the probe request;

determining a particular radio transceiver among the plurality of radio transceivers that is likely to associate with the wireless client device;

causing delay of transmission of the probe response by the particular radio transceiver by a predetermined amount of time if a signal strength of the probe request is lower than a first threshold, wherein the predetermined amount of time increases as a difference between the signal strength of the probe request and the first threshold increases; and providing the probe response to the particular radio transceiver as a second baseband signal.

26. The method of claim 25, wherein determining the particular radio transceiver is based on a plurality of received probe requests from the wireless client device.

27. The method of claim 26, further comprising:

determining a scanning interval of the wireless client device from the plurality of probe requests;

determining a predicted channel at which the wireless client device is likely to associate; and providing the probe response to the particular radio transceiver to be transmitted on the predicted channel.

\* \* \* \* \*